United States Patent
Kim et al.

(10) Patent No.: US 11,718,632 B2
(45) Date of Patent: Aug. 8, 2023

(54) CATALYST COMPOSITION AND METHOD FOR PREPARING ISOBUTENE-BASED OLIGOMER USING THE SAME

(71) Applicant: LG Chem, Ltd., Seoul (KR)

(72) Inventors: Hee Jeong Kim, Daejeon (KR); Gyeong Shin Choi, Daejeon (KR); Won Hee Kim, Daejeon (KR)

(73) Assignee: LG Chem, Ltd.

( * ) Notice: Subject to any disclaimer, the term of this patent is extended or adjusted under 35 U.S.C. 154(b) by 50 days.

(21) Appl. No.: 17/630,358

(22) PCT Filed: Mar. 30, 2021

(86) PCT No.: PCT/KR2021/003908
§ 371 (c)(1),
(2) Date: Jan. 26, 2022

(87) PCT Pub. No.: WO2021/206345
PCT Pub. Date: Oct. 14, 2021

(65) Prior Publication Data
US 2022/0275006 A1 Sep. 1, 2022

(30) Foreign Application Priority Data
Apr. 8, 2020 (KR) .................. 10-2020-0042803

(51) Int. Cl.
*C07F 5/02* (2006.01)
*C08F 4/52* (2006.01)
*C08F 110/10* (2006.01)

(52) U.S. Cl.
CPC ............. *C07F 5/027* (2013.01); *C08F 4/52* (2013.01)

(58) Field of Classification Search
CPC ........... C08F 4/52; C08F 110/10; C07F 5/027
See application file for complete search history.

(56) References Cited

U.S. PATENT DOCUMENTS

| | | |
|---|---|---|
| 2003/0088135 A1 | 5/2003 | Yun et al. |
| 2006/0195000 A1 | 8/2006 | Yun et al. |
| 2008/0221285 A1 | 9/2008 | Walter et al. |
| 2008/0249264 A1 | 10/2008 | Hanefeld et al. |
| 2008/0249267 A1 | 10/2008 | Hanefeld et al. |
| 2016/0145362 A1 | 5/2016 | Wettling et al. |
| 2020/0247924 A1 | 8/2020 | Choi et al. |

FOREIGN PATENT DOCUMENTS

| | | |
|---|---|---|
| CA | 2789843 A1 | 8/2011 |
| CN | 102762610 A | 10/2012 |
| CN | 105377910 A | 3/2016 |
| EP | 1013679 A1 | 6/2000 |
| JP | 2000191714 A | 7/2000 |
| JP | 6469769 B2 | 2/2019 |
| KR | 20000075063 A | 12/2000 |
| KR | 100324566 B1 | 2/2002 |
| KR | 100486044 B1 | 4/2005 |
| KR | 20080068107 A | 7/2008 |
| KR | 20080070057 A | 7/2008 |
| KR | 20130008551 A | 1/2013 |
| KR | 20160033736 A | 3/2016 |
| KR | 20190110957 A | 10/2019 |
| WO | 2007020247 A2 | 2/2007 |

OTHER PUBLICATIONS

Jutzi, P. et al., Synthesis, Crystal Structure, and Application of the Oxonium Acid [H(OEt2)2]+[B(C6F5)4]−, Organometallics, 2000, vol. 19, No. 7. (Mar. 2000), 3 pages.
International Search Report for PCT/KR2021/003908 dated Jul. 21, 2021. 2 pages.
Hijazi, Ahmed K., et al., "Improved synthesis, characterization and catalytic application of [H(OEt2)2][B{C6H3(m-CF3)2}4]", Journal of Organometallic Chemistry, 763-764 (Apr. 2014). 4 pages.

*Primary Examiner* — Catherine S Branch
(74) *Attorney, Agent, or Firm* — Lerner David LLP

(57) ABSTRACT

The present invention relates to a catalyst composition including an oxonium ion-based catalyst and an aluminum-based cocatalyst, and a method for preparing an isobutene-based polymer using the same.

17 Claims, No Drawings

CATALYST COMPOSITION AND METHOD FOR PREPARING ISOBUTENE-BASED OLIGOMER USING THE SAME

CROSS-REFERENCE TO RELATED APPLICATIONS

The present application is a national stage entry under 35 U.S.C. § 371 of International Application No. PCT/KR2021/003908 filed on Mar. 30, 2021, which claims priority from Korean Patent Application No. 10-2020-0042803 filed on Apr. 8, 2020, all the disclosures of which are incorporated herein by reference.

Technical Field

The present invention relates to a catalyst composition including an oxonium ion-based catalyst and an aluminum-based cocatalyst, and a method for preparing an isobutene polymer using the same.

Background Art

Polyisobutene is classified into a low molecular weight, medium molecular weight and high molecular weight range according to a molecular weight range. The low molecular weight polyisobutene has a number average molecular weight in a range of about 10,000 or less and may be classified according to the content of carbon-carbon double bonds positioned at terminals into a conventional polybutene (PB) having 20% or less of terminal carbon-carbon double bonds and high reactive polybutene (HR-PB). The high reactive polybutene may be used as a fuel additive or an engine oil additive after introducing functional groups using vinylidene functional groups at the terminals (>80%).

Butyl rubber (isobutene-isoprene rubber (IIR)) is an isobutene-isoprene copolymer which contains isobutene and about 1 to 6% of isoprene, and has excellent chemical resistance, humidity resistance, electrical insulation, etc. and thus, is used as an adhesive composition, an adhesive sheet, etc. In addition, butyl rubber undergoes additional halogenation reaction into of the double bonds of isoprene for the crosslinking/compounding with other rubber and then being used, and is characterized in not showing gas permeability, and accordingly, is widely used in the inner tube and inner liner of a tire, etc.

As a synthetic method used for preparing an isobutene-based polymer such as polyisobutene and butyl rubber, cationic polymerization is typical, and as a catalyst, a Lewis acid catalyst such as $BF_3$ and $AlCl_3$ is generally used. The Lewis acid catalyst is weak to humidity and if reacts with water, a strong acid such as HCl and HF may be produced, and this may be mixed in a product to induce defects of deteriorating product quality. In addition, due to the strong corrosiveness of the Lewis acid catalyst, high investment costing is required considering corrosion resistance when designing a process.

The cationic polymerization is mostly performed at a low temperature, and there are difficulties in careful controlling of a polymerization temperature around −100° C. according to the molecular weight of butyl rubber to produce. Particularly, to increase the molecular weight of a butyl rubber product having a medium molecular weight or more, the polymerization is required to perform after reducing the reaction temperature to an extremely low temperature of −100° C., and to control the temperature, an expensive ethylene refrigerator is required to install and use. To secure safety, a number of refrigerators are designed in double or triple, and there are defects of increasing investment costing.

Further, in a quenching working after using the Lewis acid catalyst, a large amount of an organic base such as NaOH, KOH, $NaNH_4$, and $KNH_4$ is used, and such an organic base reacts with the Lewis acid to form a highly toxic waste material such as $Na(BF_3OH)$, $Na(AlCl_3OH)$, $K(BF_3OH)$, and $K(AlCl_3OH)$, and in case of washing them, a large amount of waste water is generated.

The conventional method for preparing an isobutene-based polymer as described above has defects of various aspects, and the development of a method for efficiently preparing an isobutene-based polymer using a harmless method to environments is still required.

PRIOR ART DOCUMENT

Patent Document

JP 2000-191714 A

DISCLOSURE OF THE INVENTION

Technical Problem

An object of the present invention is to provide a novel catalyst composition which may be used for the preparation of an isobutene-based polymer.

Another object of the present invention is to provide a method for preparing an isobutene-based polymer using the catalyst composition.

Technical Solution

In order to solve the above-described tasks, the present invention provides a catalyst composition including a catalyst represented by the following Formula 1 and a cocatalyst represented by the following Formula 2:

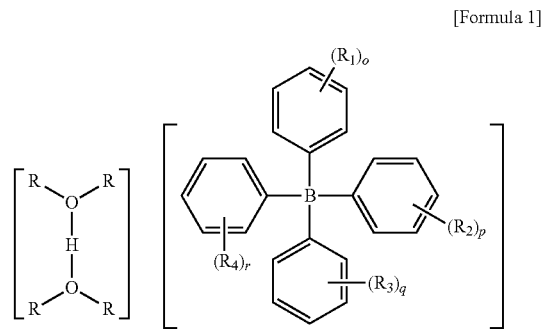

[Formula 1]

in Formula 1,
R is an alkyl group of 2 to 12 carbon atoms,
$R_1$ to $R_4$ are each independently a halogen group, and
o, p, q and r are each independently an integer of 1 to 5, $$(R_a)_m Al(Z)_{3-m}$$ [Formula 2]

in Formula 2,
$R_a$ is a hydrocarbon group of 1 to 20 carbon atoms,
Z is a halogen group, and
m is an integer of 0 to 3.

In addition, the present invention provides a method for preparing an isobutene-based polymer, including polymerizing a monomer composition including an isobutene monomer in the presence of the catalyst composition.

Advantageous Effects

The catalyst composition of the present invention is a combination of an oxonium ion-based catalyst having excellent catalyst activity and an aluminum-based cocatalyst. In case of using the catalyst composition, the active cationic polymerization of an isobutene monomer is possible even at a temperature which is not an extremely low temperature, and an isobutene polymer may be prepared with excellent efficiency.

In addition, the isobutene-based polymer prepared according to the present invention has excellent physical properties with a high weight average molecular weight and narrow molecular weight distribution.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Catalyst Composition

The catalyst composition of the present invention is characterized in including a catalyst represented by Formula 1 below and a cocatalyst represented by Formula 2 below.

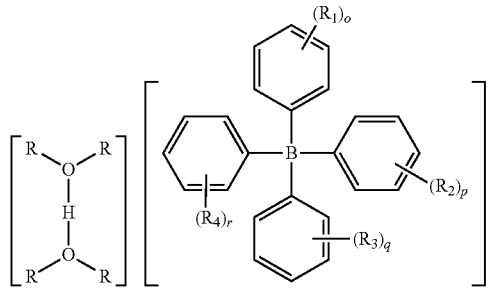

[Formula 1]

In Formula 1,
R is an alkyl group of 2 to 12 carbon atoms,
$R_1$ to $R_4$ are each independently a halogen group, and
o, p, q and r are each independently an integer of 1 to 5.

$(R_a)_m Al(Z)_{3-m}$      [Formula 2]

In Formula 2,
$R_a$ is a hydrocarbon group of 1 to 20 carbon atoms,
Z is a halogen group, and
m is an integer of 0 to 3.

In Formula 1, R is an alkyl group of 2 to 12 carbon atoms, particularly, an alkyl group of 2 to 8 carbon atoms, an alkyl group of 2 to 6 carbon atoms, an alkyl group of 2 to carbon atoms, preferably, an ethyl group, an isopropyl group or a butyl group.

In Formula 1, $R_1$ to $R_4$ are each independently a halogen group, for example, each independently F or Cl, and preferably, all $R_1$ to $R_4$ may be F. In addition, o, p, q and r may be independently an integer of 1 to 5, an integer of 3 to 5, particularly, 4 or 5. Most preferably, $R_1$ to $R_4$ may be F, and o, p, q and r may be 5.

In addition, an organic borate,

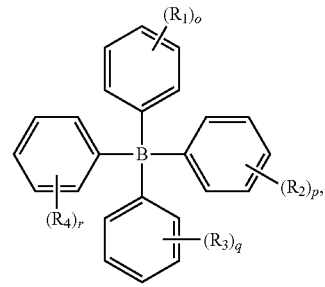

which is included in the compound represented by Formula 1 may particularly be one or more selected from the group consisting of tetrakis(pentafluorophenyl)borate and derivatives thereof, preferably, tetrakis(pentafluorophenyl)borate.

The catalyst of the present invention includes an organic borate containing one or more halogen group substituents which have strong electron withdrawing phenomenon as anion moieties, and a C—B bond is strong. Accordingly, though mixed with the cocatalyst represented by Formula 2, i.e., the aluminum-based cocatalyst, the bonding is kept, and catalyst activity is not lost, and thus, the catalyst is used for cationic polymerization to show excellent efficiency.

On the contrary, in case where the phenyl group of the anionic moiety does not include a substituent, or an alkyl substituent, etc., is bonded, for example, in case where a trifluoromethyl group is bonded to the phenyl group, side reactions may arise if combined with the cocatalyst represented by Formula 2 of the present invention, and defects of decomposing the catalyst and inhibiting the initiation of polymerization may arise.

In addition, in case of using a catalyst not corresponding to Formula 1, for example, a Lewis acid catalyst (for example, $BF_3$), an organic base such as NaOH, KOH, $NaNH_4$, and $KNH_4$, is used in a large amount for a quenching process after the reaction, and such organic base reacts with a Lewis acid to form a highly toxic waste material such as $Na(BF_3OH)$, $Na(AlCl_3OH)$, $K(BF_3OH)$, and $K(AlCl_3OH)$, and in case of washing them, a large amount of waste water is generated.

For example, the catalyst represented by Formula 1 may be selected among Formula 1-1 to Formula 1-3 below, without limitation.

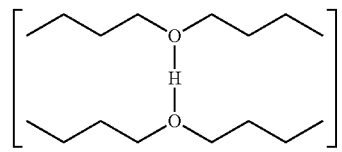

[Formula 1-1]

-continued

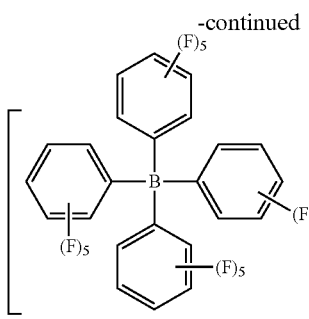

[Formula 1-2]

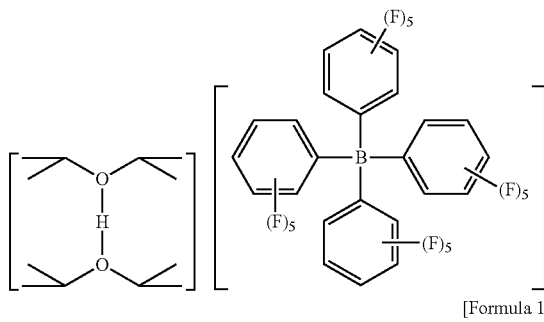

[Formula 1-3]

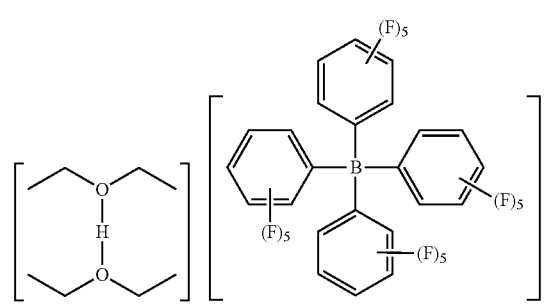

The catalyst composition of the present invention includes the cocatalyst represented by Formula 2 together with the catalyst represented by Formula 1. Here, the cocatalyst represented by Formula 2 may define aluminum trihalide, alkylaluminum dihalide, dialkylaluminum halide or trialkylaluminum according to the value of m.

$(R_a)_m Al(Z)_{3-m}$      [Formula 2]

In Formula 2,
$R_a$ is a hydrocarbon group of 1 to 20 carbon atoms,
Z is a halogen group, and
m is an integer of 0 to 3.

In Formula 2, each $R_a$ is a hydrocarbon group of 1 to 20 carbon atoms, particularly, each $R_a$ may be an alkyl group of 1 to 12 carbon atoms, a cycloalkyl group of 3 to 12 carbon atoms or an aryl group of 6 to 12 carbon atoms, preferably, an alkyl group of 1 to 6 carbon atoms, an alkyl group of 1 to 3 carbon atoms, for example, an ethyl group.

In Formula 2, each Z may be a halogen group, particularly, Br or Cl, preferably, Cl, and m which means the number of $R_a$ bonded to Al may be an integer of 0 to 3.

In the present invention, the cocatalyst represented by Formula 2 may be one or more selected from the group consisting of aluminum trichloride, methylaluminum dichloride, ethylaluminum dichloride, isopropylaluminum dichloride, ethylaluminum dibromide, dimethylaluminum chloride, diethylaluminum chloride, diisopropylaluminum chloride, diisobutylaluminum chloride, dimethylaluminum bromide, trimethylaluminum, triethylaluminum, tri-n-propylaluminum, triisoporpylaluminum, tri-n-butylaluminum, triisobutylaluminum, tri-t-butylaluminum, tripentylaluminum, trihexylaluminum, tricyclohexylaluminum, trioctylaluminum and tri-2-ethylhexylaluminum, preferably, ethylaluminum dichloride, diethylaluminum chloride or triethylaluminum, without limitation.

The catalyst composition of the present invention is suitable to use for the preparation of an isobutene-based polymer by cationic polymerization. During cationic polymerization, it is important to stabilize a cationic moiety formed during polymerization reaction, and the cocatalyst represented by Formula 2 is a strong Lewis acid and may form an ion pair with the organic borate in a catalyst structure, and through this, plays the role of effectively stabilizing the cationic moiety, and an isobutene-based polymer having a high molecular weight may be prepared.

The catalyst and cocatalyst used in the present invention react to form an aluminum cation, for example, if $[H(C_2H_5O)_2][B(C_6F_5)_4]$ is used as the catalyst, and $(C_2H_5)_2Al(Cl)$ is used as the cocatalyst, aluminum cations having strong Lewis acid properties such as $[Al(C_2H_5)Cl]^+$ and $[AlCl]^{2+}$ are formed, and these may be suitably used as polymerization initiators for the cationic polymerization of an isobutene monomer. On the contrary, since metal compounds including elements including aluminum oxide such as aluminoxane, zinc (Zn), iron (Fe), etc. has low reactivity, the formation of a metal cation by the reaction with the catalyst is difficult, and it is unsuitable for using as a cocatalyst of cationic polymerization reaction. Hence, in the present invention, the catalyst represented by Formula 1 and the cocatalyst represented by Formula 2 are used as a suitable combination for efficiently performing cationic polymerization in a high conversion ratio and preparing an isobutene-based polymer.

Particularly, in case of copolymerizing an isobutene monomer and an isoprene monomer, different from homopolymerizing an isobutene monomer, the isoprene monomer may be bonded to a cation chain undergoing polymerization to form a resonance structure, and it is apprehended that additional reaction of cations may be degraded, and additional polymerization may be performed very slowly, or termination reaction may arise. Considering this, it is important that the selection and use of a catalyst having high reactivity and a cocatalyst so that early termination may not arise.

In the present invention, a weight ratio of the catalyst represented by Formula 1 and the cocatalyst represented by Formula 2 may be 1:0.1 to 1:50. Particularly, based on 1 part by weight of the catalyst represented by Formula 1, the cocatalyst represented by Formula 2 may be 0.1 parts by weight or more, 0.2 parts by weight mor more, 0.5 parts by weight or more, and 50 parts by weight or less, 30 parts by weight or less, 10 parts by weight or less, 8 parts by weight or less, 5 parts by weight or less, 4 parts by weight or less. For example, a weight ratio of the catalyst represented by Formula 1 and the cocatalyst represented by Formula 2 may be 1:0.2 to 1:30, 1:0.3 to 1:8, 1:0.5 to 1:4.

If the above-described range is satisfied, the activation of the catalyst through the formation of a complex of the catalyst and the cocatalyst may be sufficiently carried out, cationic polymerization may be actively performed, the remaining of an unreacted material such as an unreacted cocatalyst may be prevented, and processing cost may be saved.

Preparation Method of Isobutene-Based Polymer

The method for preparing an isobutene-based polymer of the present invention is characterized in including polymerizing a monomer composition including an isobutene monomer in the presence of the catalyst composition.

In the present invention, the monomer composition may include an isobutene monomer and derivatives thereof as a monomer, and may further include an isoprene monomer, a styrene monomer, an alpha-methyl styrene monomer, a tetrahydrofuran monomer, a butadiene monomer, or combinations thereof.

According to the constitution of the monomer composition, the isobutene-based polymer may be a polyisobutene obtained by homopolymerizing an isobutene monomer or derivatives thereof, or an isobutene-isoprene copolymer obtained by polymerizing an isobutene monomer and an isoprene monomer in the present invention.

In case where the isobutene-based polymer is the isobutene-isoprene copolymer, the content of the isoprene may be 1 to 10 mol %, 1 to 8 mol %, 1 to 5 mol % based on the isobutene-isoprene copolymer.

In the present invention, the monomer composition may include a hydrocarbon solvent. That is, the polymerization of the monomer composition may be performed in a hydrocarbon solvent.

Particularly, the monomer composition of the present invention may include a hydrocarbon solvent together with the catalyst and the cocatalyst, and the hydrocarbon solvent may use a mixture of a nonpolar hydrocarbon solvent and a halogenated hydrocarbon solvent, or a nonpolar hydrocarbon solvent may be used solely.

The nonpolar hydrocarbon solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, preferably, hexane, without limitation. In addition, the aromatic hydrocarbon solvent may be one or more selected from the group consisting of benzene, toluene, xylene and ethylbenzene, preferably, toluene, without limitation.

The halogenated hydrocarbon solvent may be one or more selected from the group consisting of chloromethane, dichloroethane, trichloromethane, 1-chlorobutane and chlorobenzene, without limitation.

With respect to the hydrocarbon solvent, if the solubility of the catalyst is excellent, and the solubility of the isobutene-based polymer is poor, an initial reaction rate may be excellent, and a polymerization conversion ratio may be shown high, but in the isobutene-based polymer produced, chain propagation reaction is performed, and an isobutene-based polymer having a relatively small molecular weight may be prepared. On the contrary, with respect to the hydrocarbon solvent, if the solubility of the catalyst is relatively poor, and the solubility of the isobutene-based polymer is excellent, a polymerization conversion ratio may be reduced, but chain propagation may be smoothly carried out, and an isobutene-based polymer having a high molecular weight may be prepared. Considering this, a suitable hydrocarbon solvent may be selected in ranges satisfying a desired degree of molecular weight and conversion ratio, and used.

In the present invention, if the nonpolar hydrocarbon solvent and the halogenated hydrocarbon solvent are mixed and used as a solvent, a mixing ratio may be 100:1 to 1:2 by volume, particularly, 100:1 to 1:1 by volume, without limitation.

If the monomer composition includes a hydrocarbon solvent, the isobutene monomer may be 10 to 60 wt %, particularly, 15 to 50 wt %, 20 to 40 wt % based on the monomer composition. If the concentration of the isobutene monomer is within the range, cationic polymerization may be efficiently performed, and a high conversion ratio may be accomplished.

The hydrocarbon solvent may be the same as the hydrocarbon solvent composing the catalyst composition or may be a different one.

In the present invention, the catalyst represented by Formula 1 may be 0.005 to 0.5 parts by weight, particularly, 0.005 parts by weight or more, 0.01 parts by weight or more, 0.02 parts by weight or more, and 0.5 parts by weight or less, 0.4 parts by weight or less, 0.3 parts by weight or less, 0.2 parts by weight or less, based on 100 parts by weight of the isobutene monomer.

In the above-described range, the amount of the catalyst is sufficient with respect to the monomer, and copolymerization reaction may be smoothly performed, and economic feasibility may be achieved.

In the present invention, the cocatalyst represented by Formula 2 may be 0.005 to 0.5 parts by weight, particularly, 0.005 parts by weight or more, 0.01 parts by weight or more, 0.02 parts by weight or more, and 0.5 parts by weight or less, 0.4 parts by weight or less, 0.3 parts by weight or less, 0.2 parts by weight or less, based on 100 parts by weight of the isobutene monomer.

If the cocatalyst is used in the above-described range, suitable using effects of the cocatalyst may be achieved, and the isobutene-based polymer may be prepared in excellent efficiency. If an excessive amount is added, it is apprehended that the increase of processing cost may be induced according to the increase of the amount of remaining by-products in a final polymer, and accordingly, it is preferably that a suitable amount of the cocatalyst is controlled to use within the above-described range.

In the present invention, the polymerization may be performed at a temperature of $-50$ to $-10°$ C., and in order to efficiently prepare an isobutene-based polymer having a high molecular weight according to the object of the present invention, the polymerization may be performed particularly at a temperature of $-50°$ C. or more, $-45°$ C. or more, and $-10°$ C. or less, $-15°$ C. or less.

In the above-described range, catalyst activity is excellent, cationic polymerization may be actively performed, and the preparation of an isobutene-based polymer having a low molecular weight by chain transfer may be prevented.

In addition, the polymerization may be performed in the above-described temperature range for 10 minutes to 3 hours, particularly, 10 minutes or more, 30 minutes or more, 40 minutes or more, and 3 hours or less, 2 hours or less, 1 hour or less.

In the above-described range, cationic polymerization may be sufficiently performed, and the reduction of a molecular weight or the increase of molecular weight distribution of an isobutene-based polymer due to overreaction may be prevented, and an isobutene-based polymer having excellent physical properties may be efficiently prepared.

In the present invention, by using the catalyst composition including the catalyst represented by Formula 1 and the cocatalyst represented by Formula 2, an isobutene-based polymer having a high molecular weight and narrow molecular weight distribution may be prepared.

Particularly, according to the preparation method of the present invention, an isobutene-based polymer having a weight average molecular weight of 100,000 to 1,000,000 g/mol may be prepared. Particularly, the weight average molecular weight of the isobutene-based polymer prepared according to the present invention may be 100,000 g/mol or more, 120,000 g/mol or more, 130,000 g/mol or more, and 1000,000 g/mol or less, 800,000 g/mol or less, 600,000 g/mol or less, 550,000 g/mol or less. In addition, the number average molecular weight of the isobutene-based polymer may be 30,000 g/mol or more, particularly, 50,000 g/mol or more, 70,000 g/mol or more, 500,000 g/mol or more, and 400,000 g/mol or less, 300,000 g/mol or less.

In addition, the molecular weight distribution of the isobutene-based polymer may be 1.5 to 3.0, particularly, 1.5 or more, and 3.0 or less, 2.7 or less, 2.6 or less, 2.3 or less.

Through the preparation method of the present invention, the preparation by diversely controlling the physical properties of the isobutene-based polymer within the above-described ranges may be possible, and particularly, by controlling the type or amount of the cocatalyst, the molecular weight and molecular weight distribution may be easily controlled according to desired objects.

The weight average molecular weight and the number average molecular weight are polystyrene converted molecular weights analyzed by gel permeation chromatography (GPC), and the molecular weight distribution may be calculated from the ratio of (weight average molecular weight)/(number average molecular weight).

The preparation method of the isobutene-based polymer of the present invention may further perform a step of removing the catalyst after the step of cationic polymerization of a monomer. The catalyst of the present invention may be efficiently removed through a simple physical filtering step, and its use and removal is even easier than a Lewis acid catalyst of the conventional technique.

Particularly, after polymerizing the isobutene-based polymer, the organic solvent may be removed to control the organic solvent in 40 wt % or less, 20 wt % or less, or 5 wt % or less of an oligomer or a polymer. Then, in case of a fluidal polymer, a step of filtering insoluble materials using a glass filter of 80 mesh or more, 100 mesh or more, or 200 mesh or more is performed. Otherwise, the catalyst may be removed through passing the fluidal polymer using a silica, celite or zeolite filter.

Meanwhile, in case of a polymer having small fluidity, fluidity is provided using one or more selected from the group consisting of a linear alkyl solvent, for example, pentane, cyclopentane, hexane, cyclohexane, heptane and octane, and an ether solvent, for example, diethyl ether and petroleum ether, and then, a step of filtering through the glass filter, a silica filter, a celite filter or a zeolite filter may be performed.

Generally, by dissolving the isobutene-based polymer produced in an organic solvent including pentane, cyclopentane, hexane, cyclohexane, heptane, octane, diethyl ether or petroleum ether and then, washing, the catalyst is removed. However, in the present invention, since the catalyst represented by Formula 1 may be efficiently removed through the above-described simple filtering step, a separate washing step may not be performed.

In addition, the preparation method of the present invention may further include a step of drying remaining solvents after the step of filtering. For example, a drying temperature may be 30 to 200° C., or 40 to 150° C., and a vacuum degree may be 300 torr or less, 200 torr or less, or 100 torr or less. As a result, a desired isobutene-based polymer may be efficiently obtained. In addition, a drying method is not specifically limited, but may be a common method.

In addition, in the preparation method of the isobutene-based polymer of the present invention, a step of drying a halogenated hydrocarbon solvent may be separately performed or not after the step of polymerization and before the filtering. In case of performing the drying step, drying conditions may be the same as described above, without specific limitation.

In case of separately performing the drying step of the halogenated hydrocarbon solvent, there are advantages in that an isobutene-based polymer may be obtained in a higher purity. However, according to the present invention, since the catalyst may be easily removed through the simple filtering as described above, the separate dying step of the halogenated hydrocarbon solvent may be omitted after the step of polymerization and before the filtering, there are advantages in simplifying a process.

EXAMPLES

Hereinafter, the present invention will be described in more detail by embodiments. However, the embodiments below are only illustrations of the present invention, and the invention is not limited thereto.

Preparation Examples and Comparative Preparation Examples: Preparation of Catalysts Preparation Example 1

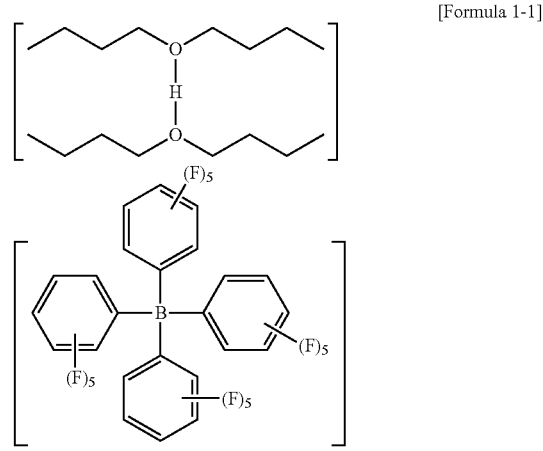

[Formula 1-1]

In a glove box, 100 mg of $[H(Et_2O)_2][B(C_6F_5)_4]$ (Ashai Glass Co.) was put together with a magnetic bar in a vial and dissolved in 2 mL of dichloromethane. Then, 3 equivalents of anhydrous dibutyl ether (purchased from Aldrich) were injected thereto, followed by stirring in vacuum conditions for 30 minutes. After stirring, all solvents were removed in vacuum conditions, and a white powder obtained was washed using anhydrous hexane by 3 mL×three times, and then dried in vacuum conditions to obtain a catalyst.

Preparation Example 2

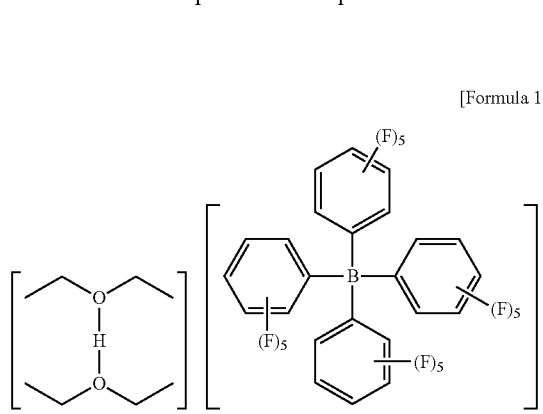
[Formula 1-3]

In a glove box under argon conditions, 1 g of [Li(Et$_2$O)$_n$][B(C$_6$F$_5$)$_4$] (TCI Co.) was put in a round flask, and 10 mL of anhydrous diethyl ether was injected thereto. The solution thus prepared was connected with a Schlenk line, and argon conditions were set. A cooling bath was made using acetonitrile and dry ice, and at −40° C., the solution thus prepared was stirred. During stirring, 5 equivalents of 1 M HCl in diethyl ether (Sigma-Aldrich) were injected through a syringe. At −40° C., stirring was further performed for 30 minutes, and then, the temperature was slowly raised to room temperature.

In the glove box, a salt produced in the solution was removed by filtering, a transparent solution was collected, and solvents were removed by vacuum drying. After removing the solvents, washing was performed with anhydrous hexane by 5 mL×three times, and vacuum drying was performed again to obtain a target product.

Preparation Example 3

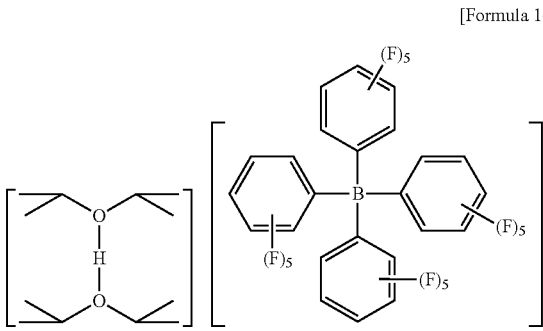
[Formula 1-2]

A catalyst was prepared by the same method as in Preparation Example 1 except for using anhydrous diisopropyl ether instead of the anhydrous dibutyl ether.

Comparative Preparation Example 1

Brookhart's acid represented by a formula below was prepared according to a known method.

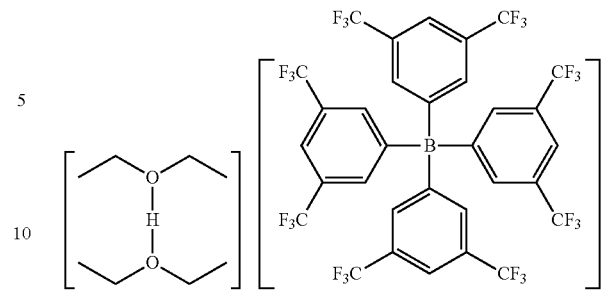

Particularly, NaBAr'$_4$ and hydrochloride were reacted in diethyl ether, and sodium tetrakis[3,5-bis(trifluoromethyl)phenyl]borate was purchased from Sigma-Aldrich and used.

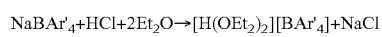

NaBAr'$_4$+HCl+2Et$_2$O→[H(OEt$_2$)$_2$][BAr'$_4$]+NaCl

Comparative Preparation Example 2

[Et$_3$O][BF$_4$] (Sigma-Aldrich) was purchased and prepared.

Comparative Preparation Example 3

[BF$_3$][Et$_2$] (Sigma-Aldrich) was purchased and prepared.

Examples and Comparative Examples: Preparation of Isobutene-Based Polymers (1) Preparation of Polyisobutene Example 1

To an Andrew glass flask well-dried in a convection oven, a magnetic bar was put, and vacuum was applied and kept for about 1 hour. An ice bath was made using acetone-dry ice, and the Andrew glass flask was put therein to cool. An isobutene line was connected, and an appropriate amount was condensed. The amount of an isobutene monomer injected into the Andrew glass flask was checked, dried toluene was added, and the concentration of the isobutene monomer was controlled to 20 wt % based on a monomer composition. The temperature of the Andrew glass flask thus prepared was controlled to −20° C.

The catalyst of Preparation Example 1 and an Et$_2$AlCl cocatalyst were prepared in a glove box and respectively dissolved in toluene to be 0.05 parts by weight based on 100 parts by weight of the isobutene monomer, and then, injected using syringes. After 45 minutes from the injection, the Andrew glass flask was opened, a remaining isobutene monomer was removed, and the reaction was quenched with methanol. Remaining solvents were removed through a rotary evaporator, and a remaining polymer was completely dried in vacuum until no weight change was observed.

Examples 2 to 10, and Comparative Examples 1 to 6

Polyisobutenes were prepared by the same method as in Example 1 except for changing reaction conditions as shown in Table 1 below.

TABLE 1

| | Isobutene concentration (wt %) | Catalyst Type | Catalyst Content (based on 100 parts by weight) | Cocatalyst Type | Cocatalyst Content (based on 100 parts by weight of IB) | Reaction solvent | Polymerization temp (° C.) |
|---|---|---|---|---|---|---|---|
| Example 1 | 20 | Preparation Example 1 | 0.05 | Et$_2$AlCl | 0.05 | Toluene | −20 |
| Example 2 | 20 | Preparation Example 1 | 0.05 | Et$_2$AlCl | 0.05 | Toluene | −40 |
| Example 3 | 40 | Preparation Example 1 | 0.05 | Et$_2$AlCl | 0.05 | Toluene | −20 |
| Example 4 | 40 | Preparation Example 1 | 0.05 | Et$_2$AlCl | 0.05 | Toluene | −40 |
| Example 5 | 40 | Preparation Example 1 | 0.05 | Et$_3$Al | 0.05 | Toluene | −40 |
| Example 6 | 20 | Preparation Example 1 | 0.05 | Et$_2$AlCl | 0.05 | Hexane | −40 |
| Example 7 | 40 | Preparation Example 1 | 0.05 | Et$_2$AlCl | 0.05 | Hexane | −40 |
| Example 8 | 50 | Preparation Example 1 | 0.05 | Et$_2$AlCl | 0.05 | Hexane | −40 |
| Example 9 | 40 | Preparation Example 2 | 0.05 | Et$_2$AlCl | 0.05 | Hexane | −40 |
| Example 10 | 40 | Preparation Example 3 | 0.05 | Et$_2$AlCl | 0.05 | Hexane | −40 |
| Comparative Example 1 | 20 | Preparation Example 1 | 0.01 | — | — | Toluene | −40 |
| Comparative Example 2 | 40 | Preparation Example 1 | 0.05 | MAO | 0.05 | Toluene | −40 |
| Comparative Example 3 | 20 | — | — | Et$_2$AlCl | 0.05 | Toluene | −40 |
| Comparative Example 4 | 20 | AlCl$_3$ | 0.05 | Et$_2$AlCl | 0.05 | Toluene | −40 |
| Comparative Example 5 | 40 | Comparative Preparation Example 1 | 0.05 | Et$_2$AlCl | 0.05 | Hexane | −40 |
| Comparative Example 6 | 40 | Comparative Preparation Example 2 | 0.05 | Et$_2$AlCl | 0.05 | Hexane | −40 |

(2) Preparation of Isobutene-Isoprene Copolymers

Example 11

To an Andrew glass flask well-dried in a convection oven, a magnetic bar was put, and vacuum was applied and kept for about 1 hour. After cooling the Andrew glass flask using a low-temperature reactor, an isobutene line was connected, and 20 g of an isobutene monomer was injected. By using a syringe, an isoprene monomer was injected in 2 to 5 wt % based on the isobutene monomer. A solvent used for reaction was injected into the Andrew glass flask, and the concentration of the isobutene monomer was controlled to 40 wt % based on a monomer composition. The temperature of the Andrew glass flask thus prepared was controlled to −40° C. A catalyst and a cocatalyst were prepared in a glove box and dissolved in small amounts of dichloromethane, and then, injected using syringes. After 45 minutes from the injection, the Andrew glass flask was opened, remaining isobutene was removed, and the reaction was quenched with methanol. In this case, the isobutene-isoprene copolymer thus obtained was completely dried in vacuum until no weight change was observed.

Examples 12 to 17, and Comparative Examples 7 to 15

Isobutene-isoprene copolymers were prepared by the same method as in Example 11 except for changing reaction conditions as shown in Table 1 below.

TABLE 2

| | Isobutene concentration (wt %) | Catalyst Type | Catalyst Content (based on 100 parts by weight) | Cocatalyst Type | Cocatalyst Content (based on 100 parts by weight) |
|---|---|---|---|---|---|
| Example 11 | 40 | Preparation Example 1 | 0.100 | (Et)$_2$AlCl | 0.05 |
| Example 12 | 40 | Preparation Example 1 | 0.050 | (Et)$_2$AlCl | 0.10 |
| Example 13 | 40 | Preparation Example 1 | 0.025 | (Et)$_2$AlCl | 0.10 |
| Example 14 | 40 | Preparation Example 1 | 0.025 | (Et)$_2$AlCl | 0.20 |
| Example 15 | 40 | Preparation Example 1 | 0.025 | (Et)Al(Cl)$_2$ | 0.05 |
| Example 16 | 40 | Preparation Example 1 | 0.025 | (Et)Al(Cl)$_2$ | 0.03 |
| Example 17 | 40 | Preparation Example 1 | 0.025 | AlCl$_3$ | 0.10 |
| Comparative Example 7 | 40 | — | — | (Et)$_2$AlCl | 0.05 |
| Comparative Example 8 | 40 | Comparative Preparation Example 1 | 0.025 | (Et)$_2$AlCl | 0.10 |
| Comparative Example 9 | 40 | Comparative Preparation Example 1 | 0.025 | (Et)$_2$AlCl | 0.10 |

TABLE 2-continued

|  | Isobutene concentration (wt %) | Catalyst Type | Catalyst Content (based on 100 parts by weight) | Cocatalyst Type | Cocatalyst Content (based on 100 parts by weight) |
|---|---|---|---|---|---|
| Comparative Example 10 | 40 | Preparation Example 1 | 0.025 | — | — |
| Comparative Example 11 | 40 | Preparation Example 1 | 0.025 | MMAO | 0.10 |
| Comparative Example 12 | 40 | Preparation Example 1 | 0.025 | Al (O-secBu)$_3$ | 0.10 |
| Comparative Example 13 | 40 | Preparation Example 1 | 0.025 | ZnCl$_2$ | 0.10 |
| Comparative Example 14 | 40 | Preparation Example 1 | 0.025 | FeCl$_3$ | 0.10 |
| Comparative Example 15 | 40 | Comparative Preparation Example 3 | 0.025 | — | — |

Experimental Examples: Analysis of Isobutene-Based Polymer (1) Polymerization Conversion Ratio (%)

The weight of a dried isobutene-based polymer was measured and a polymerization conversion ratio was calculated.

(2) Weight Average Molecular Weight (Mw), Number Average Molecular Weight (Mn), Peak Molecular Weight (Mp) and Molecular Weight Distribution (MWD)

Measurement was conducted under gel permeation chromatography (GPC) analysis conditions below, a weight average molecular weight (Mw) and a number average molecular weight (Mn) were measured, and molecular weight distribution was calculated from the value of (weight average molecular weight)/(number average molecular weight).

Column: PL MiniMixed B×2

Solvent: THF

Flow rate: 0.3 ml/min

Specimen concentration: 2.0 mg/ml

Injection amount: 10 μL

Column temperature: 40° C.

Detector: RI detector (Agilent Co.)

Standard: polystyrene (corrected by a cubic function)

Data processing: ChemStation

TABLE 3

|  | Polymerization conversion ratio (%) | Mw | Mn | MWD |
|---|---|---|---|---|
| Example 1 | >99 | 165,119 | 75,054 | 2.2 |
| Example 2 | >99 | 306,398 | 165,159 | 1.9 |
| Example 3 | >99 | 210,358 | 105,735 | 2.0 |
| Example 4 | >99 | 429,595 | 198,131 | 2.2 |
| Example 5 | >99 | 139,934 | 86,207 | 1.6 |
| Example 6 | 65 | 403,953 | 220,877 | 1.8 |
| Example 7 | 78 | 428,695 | 194,242 | 2.2 |
| Example 8 | 73 | 431,061 | 227,838 | 1.9 |
| Example 9 | 80 | 510,873 | 228,427 | 2.2 |
| Example 10 | 85 | 403,953 | 220,877 | 1.8 |
| Comparative Example 1 | >99 | 23,828 | 9,694 | 2.5 |
| Comparative Example 2 | 56 | 292,024 | 76,655 | 3.8 |
| Comparative Example 3 | — | — | — | — |
| Comparative Example 4 | — | — | — | — |
| Comparative Example 5 | — | — | — | — |
| Comparative Example 6 | 30 | 366,295 | 198,098 | 1.9 |

TABLE 4

|  | Polymerization conversion ratio (%) | Isoprene (mol %) | Mn | Mw | Mp | MWD |
|---|---|---|---|---|---|---|
| Example 11 | 60 | 4.9 | 109,231 | 295,648 | 138,833 | 2.71 |
| Example 12 | >90 | 4.2 | 110,945 | 265,957 | 111,811 | 2.40 |
| Example 13 | 70 | 1.8 | 260,600 | 410,252 | 349,919 | 1.57 |
| Example 14 | 75 | 1.9 | 161,502 | 315,980 | 191,531 | 1.96 |
| Example 15 | 78 | 2.0 | 173,949 | 322,954 | 230,034 | 1.86 |
| Example 16 | 65 | 1.8 | 87,506 | 186,678 | 131,393 | 2.13 |
| Example 17 | >90 | 2.0 | 80,137 | 159,715 | 116,329 | 1.99 |
| Comparative Example 7 | — | — | — | — | — | — |
| Comparative Example 8 | — | — | — | — | — | — |
| Comparative Example 9 | — | — | — | — | — | — |
| Comparative Example 10 | <3 | 1.8 | 5,431 | 26,238 | 24,784 | 4.83 |
| Comparative Example 11 | 16 | 1.5 | 22,893 | 42,265 | 41,415 | 1.85 |
| Comparative Example 12 | — | — | — | — | — | — |
| Comparative Example 13 | — | — | — | — | — | — |
| Comparative Example 14 | — | — | — | — | — | — |

TABLE 4-continued

|  | Polymerization conversion ratio (%) | Isoprene (mol %) | Mn | Mw | Mp | MWD |
|---|---|---|---|---|---|---|
| Comparative Example 15 | — | — | — | — | — | — |

As described in the tables, in case of the Examples for preparing isobutene-based polymers using the catalyst composition of the present invention, a high polymerization conversion ratio was shown, and isobutene-based polymers having a high molecular weight could be prepared.

Particularly, the preparation results of polyisobutenes are as follows. In Comparative Example 1 in which the cocatalyst was not used, the molecular weight of the polyisobutene was markedly low. In Comparative Example 2 in which an aluminoxane not corresponding to Formula 2 was used as the cocatalyst, the polymerization conversion ratio was low, the molecular weight distribution of the polyisobutene was broad, and the deterioration of physical properties occurred.

In addition, in Comparative Examples 3 and 4, in which the catalyst represented by Formula 1 was not used, polymerization was not performed. In Comparative Example 5 in which the catalyst of Comparative Preparation Example 1 was used, polymerization was not performed, and a polyisobutene could not be prepared, and in Comparative Example 6 in which the catalyst of Comparative Preparation Example 2 was used, the polymerization conversion ratio was low to a degree of 30%.

Meanwhile, the preparation results of isobutene-isoprene copolymers are as follows. In case of Comparative Example 7 in which the catalyst of Formula 1 was not used, cationic polymerization was not performed, and a copolymer could not be obtained, and in case of Comparative Example 10 in which the cocatalyst was not used, the polymerization conversion ratio was very low and less than 3%, a copolymer could not be obtained properly in contrast to reactants used, and the copolymer prepared had a very low molecular weight and broad molecular weight distribution.

Comparative Examples 8 and 9 used the catalyst of Comparative Preparation Example 1 instead of the catalyst of Formula 1, and cationic polymerization was not performed, and a copolymer could not be obtained.

Meanwhile, in case of Comparative Example 11 in which an aluminoxane-based cocatalyst was used instead of the cocatalyst represented by Formula 2, it could be confirmed that the polymerization conversion ratio was low, the number average molecular weight of the copolymer was a very low value compared to the Examples. In Comparative Example 12 in which aluminum oxide was used as the cocatalyst, and Comparative Examples 13 and 14, in which a Zn-based or Fe-based compound was used as the cocatalyst, cationic polymerization could not be properly performed, and a copolymer could not be obtained. In Comparative Example 15 in which a catalyst not corresponding to Formula 1 was used, a copolymer could not be obtained either.

As described above, it could be confirmed that an isobutene-based polymer with a high molecular weight was obtained in an excellent conversion ratio by using the catalyst represented by Formula 1 and the cocatalyst represented by Formula 2 according to the present invention.

The invention claimed is:

1. A catalyst composition comprising a catalyst represented by the following Formula 1 and a cocatalyst represented by the following Formula 2:

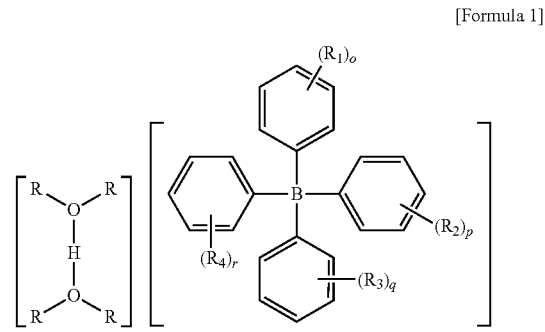

[Formula 1]

in Formula 1,
R is an alkyl group of 2 to 12 carbon atoms,
$R_1$ to $R_4$ are each independently a halogen group, and
o, p, q and r are each independently an integer of 1 to 5, $$(R_a)_m Al(Z)_{3-m}$$ [Formula 2]

in Formula 2,
$R_a$ is each independently a hydrocarbon group of 1 to 20 carbon atoms,
Z is each independently a halogen group, and
m is an integer of 0 to 3.

2. The catalyst composition according to claim 1, wherein, in Formula 1,
R is an alkyl group of 2 to 8 carbon atoms,
$R_1$ to $R_4$ are each independently F or Cl, and
o, p, q and r are each independently an integer of 3 to 5.

3. The catalyst composition according to claim 1, wherein, in Formula 1,
R is an alkyl group of 2 to 6 carbon atoms,
$R_1$ to $R_4$ are F, and
o, p, q and r are each independently an integer of 4 or 5.

4. The catalyst composition according to claim 1, wherein, in Formula 2,
each $R_a$ is an alkyl group of 1 to 12 carbon atoms, a cycloalkyl group of 3 to 12 carbon atoms or an aryl group of 6 to 12 carbon atoms,
each Z is Br or Cl, and
m is an integer of 0 to 3.

5. The catalyst composition according to claim 1, wherein, in Formula 2,
each $R_a$ is an alkyl group of 1 to 6 carbon atoms,
each Z is Cl, and
m is an integer of 0 to 3.

6. The catalyst composition according to claim 1, wherein the cocatalyst represented by Formula 2 is one or more selected from the group consisting of aluminum trichloride, methylaluminum dichloride, ethylaluminum dichloride, isopropylaluminum dichloride, ethylaluminum dibromide, dimethylaluminum chloride, diethylaluminum chloride, diisopropylaluminum chloride, diisobutylaluminum chloride, dimethylaluminum bromide, trimethylaluminum, triethylaluminum, tri-n-propylaluminum, triisoporpylaluminum, tri-n-butylaluminum, triisobutylaluminum, tri-t-butylaluminum, tripentylaluminum, trihexylaluminum, tricyclohexylaluminum, trioctylaluminum and tri-2-ethylhexylaluminum.

7. The catalyst composition according to claim 1, wherein a weight ratio of the catalyst represented by Formula 1 and the cocatalyst represented by Formula 2 is 1:0.1 to 1:50.

8. The catalyst composition according to claim 1, wherein an organic borate included in the catalyst represented by Formula 1 is tetrakis(pentafluorophenyl)borate.

9. A method for preparing an isobutene-based polymer, the method comprising polymerizing a monomer composition comprising an isobutene monomer, in the presence of the catalyst composition of claim 1.

10. The method for preparing an isobutene-based polymer according to claim 9, wherein an amount of the catalyst represented by Formula 1 is 0.005 to 0.5 parts by weight based on 100 parts by weight of the isobutene monomer.

11. The method for preparing an isobutene-based polymer according to claim 9, wherein an amount of the cocatalyst represented by Formula 2 is 0.005 to 0.5 parts by weight based on 100 parts by weight of the isobutene monomer.

12. The method for preparing an isobutene-based polymer according to claim 9, wherein the polymerization is performed at a temperature of −50 to −10° C.

13. The method for preparing an isobutene-based polymer according to claim 9, wherein the polymerization is performed for 10 minutes to 3 hours.

14. The method for preparing an isobutene-based polymer according to claim 9, wherein the isobutene-based polymer is polyisobutene.

15. The method for preparing an isobutene-based polymer according to claim 9, wherein the isobutene-based polymer is an isobutene-isoprene copolymer.

16. The catalyst composition according to claim 1, wherein the catalyst represented by Formula 1 is represented by Formula 1-1, Formula 1-2, or Formula 1-3 below:

[Formula 1-1]

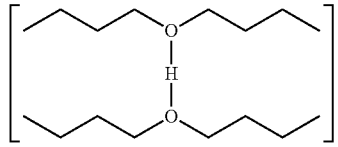

[Formula 1-2]

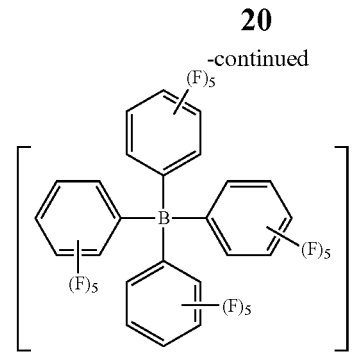

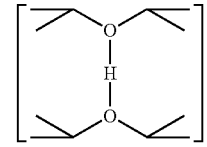

[Formula 1-3]

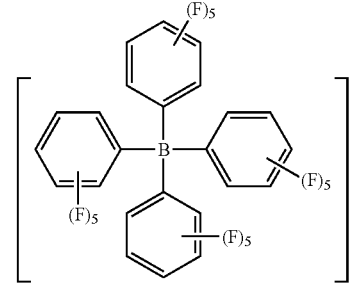

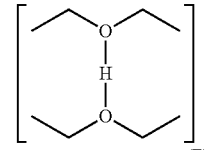

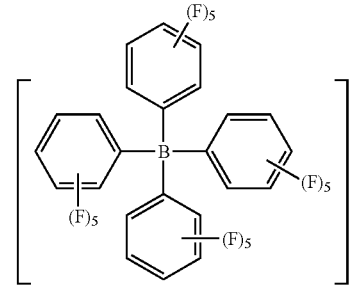

17. The method for preparing an isobutene-based polymer according to claim 15, wherein a content of the isoprene is 1 to 10 mol % based on the isobutene-isoprene copolymer.

* * * * *